United States Patent [19]

Fitts, III et al.

[11] 4,151,372
[45] Apr. 24, 1979

[54] MESSAGE REGISTRATION PULSE GENERATOR

[75] Inventors: Fred E. Fitts, III, New Hartford; J. D. Batteas, Rome, both of N.Y.

[73] Assignee: DND Teletronics, Inc., Utica, N.Y.

[21] Appl. No.: 878,261

[22] Filed: Feb. 16, 1978

Related U.S. Application Data

[63] Continuation-in-part of Ser. No. 717,947, Aug. 26, 1976, abandoned.

[51] Int. Cl.² .......................................... H04M 15/12
[52] U.S. Cl. ................................................ 179/7.1 R
[58] Field of Search .............. 179/7.1 R, 7.1 TP, 7 R, 179/8 A, 6.31, 7 MM, 2 TC

[56] References Cited

U.S. PATENT DOCUMENTS

| | | | |
|---|---|---|---|
| 3,573,378 | 4/1971 | Leyburn et al. | 179/7.1 R |
| 3,769,463 | 10/1973 | Graham et al. | 179/7.1 TP |
| 3,801,745 | 4/1974 | Zuckerman | 179/7.1 R |
| 3,806,652 | 4/1974 | Woolf et al. | 179/7.1 R |
| 3,934,240 | 1/1976 | Norling | 179/7.1 R |
| 3,982,073 | 9/1976 | Baltzer et al. | 179/7.1 TP |
| 4,090,034 | 5/1978 | Moylan | 179/7 R |

FOREIGN PATENT DOCUMENTS

| | | | |
|---|---|---|---|
| 2460982 | 12/1974 | Fed. Rep. of Germany | 179/7.1 R |
| 2613359 | 3/1976 | Fed. Rep. of Germany | 179/7.1 R |

*Primary Examiner*—Kathleen H. Claffy
*Assistant Examiner*—Gerald L. Brigance
*Attorney, Agent, or Firm*—Dennison, Dennison, Meserole & Pollack

[57] ABSTRACT

An apparatus for generating message unit pulses for message rate billing which includes means responsive to answer pulse recognition signals and electronic answer supervision from a central office for providing separate and variable numbers of pulses per event based on duration, time of day and distance of call.

13 Claims, 5 Drawing Figures

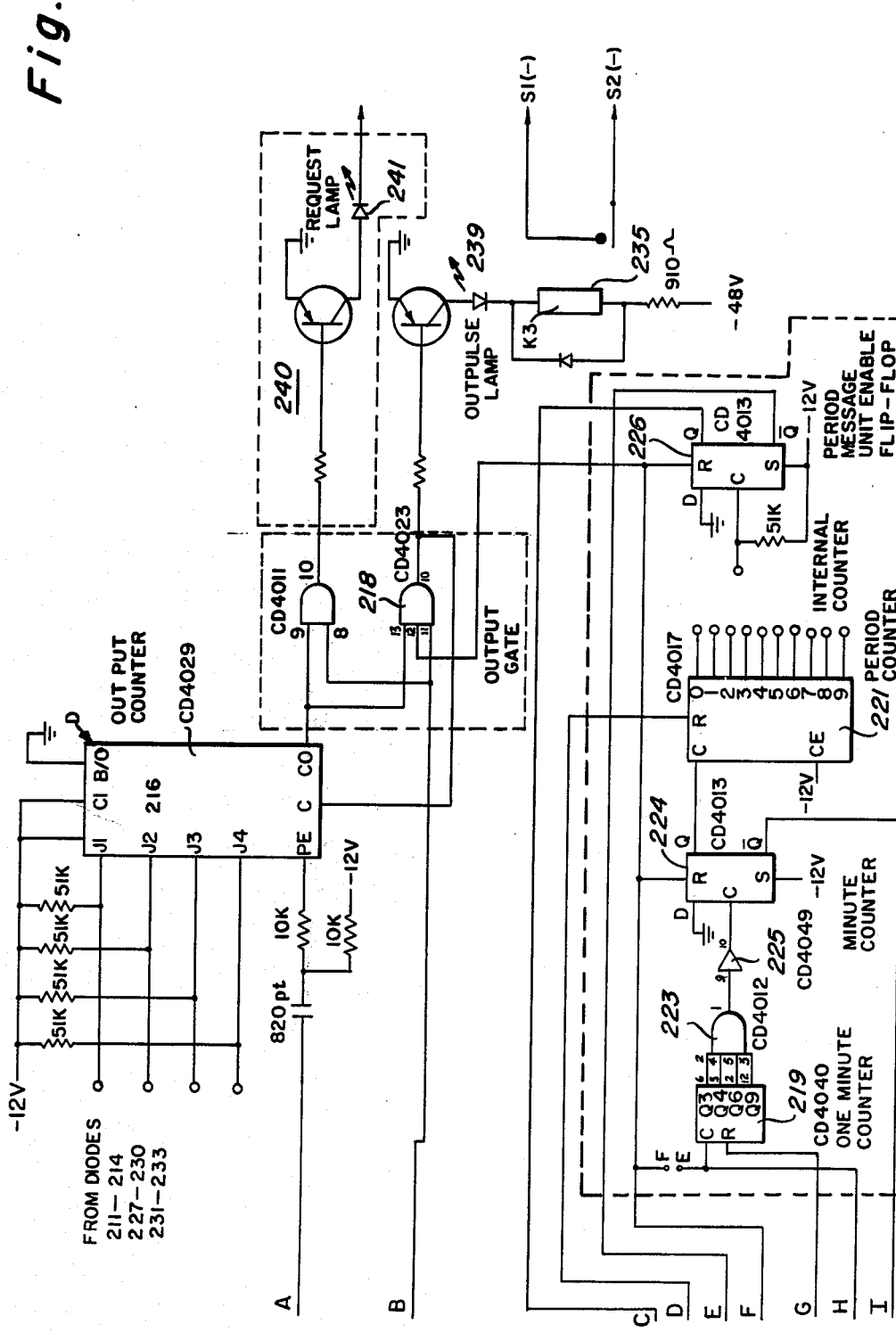

MESSAGE REGISTRATION PULSE GENERATOR

This is a continuation-in-part of application Ser. No. 717,947, filed Aug. 26, 1976 now abandoned.

THE INVENTION

The present invention relates to an apparatus compatible with branch exchange telephone systems adapted to generate message unit pulses for automated telephone billing systems.

BACKGROUND OF THE INVENTION

The Public Service Commission of the State of California requires timing and pulsing options in telephone branch exchanges of the type utilized in hotels or motels or central offices where controlled billing of local telephone calls is required. In addition to the more recent statutory requirements, it has been desirable to provide a means for automatic billing of local and toll telephone calls. Unfortunately, the prior art has been able to accomplish the required message unit billing by devices which are severley limited in versatility, complex and comprised of mechanical means prone to repetitive failures and in some instances prohibitively costly.

An example of an early timing arrangement for telephone calls is U.S. Pat. No. 2,488,797 on "Electrically Operated Timing Arrangement" issued to G. T. Baker on Nov. 22, 1949. This patent incorporates a timing arrangement comprised of rotary stepping switches and relays which are successively operated by the stepping switches to provide an elapsed time register. This type of timing output is not readily compatible with state of the art digital billing systems. An object of the present invention is to improve upon those types of systems by providing a message rate billing means which will produce pulses as a function of time that are readily processed by automated billing systems.

U.S. Pat. No. 2,596,308 on "Metering System For Telephonee" issued to Ernest Ungar on May 13, 1952 is a further example of prior means to achieve message rate billing via mechanical stepping switches. In this system the switches produce a plurality of pulses adapted to drive a metering circuit or a coin control circuit.

A more recent development in the art is U.S. Pat. No. 2,984,704 on "Automatic Determination Of Toll Call Charges" issued to N. S. Terry et al, on May 16, 1961. This system utilizes a plurality of relays and gas discharge lamps to monitor the time required for a toll call. It is an object of the present invention to overcome the various hardware considerations present in systems of the above type by minimizing the number of mechanical switching components required.

The concept of using a pulse generator to create timed pulses for measuring the duration of a telephone call is presented in U.S. Pat. No. 3,573,378 on "Telephone Call Timing Circuit" issued to D. Leyburn on Apr. 6, 1971. This reference incorporates cascaded counting circuits adapted to count the pulses during a telephone call and increment a register when overtime charges are incurred. Systems such as this lack the ability to adapt to variations in billing rate charges.

OBJECTS OF THE INVENTION

A primary objective of the present invention is to produce a message unit pulse generating circuit for message rate billing which is capable of producing a varying number of pulses as a function of the time of day and duration of the call and the distance between stations.

A further objective of the instant invention is to provide a means to generate pulses for a message rate billing system via circuitry comprised of solid state devices to minimize circuit mortality rates.

A further objective of the present invention is to provide a message registration pulse generator incorporating redundant circuitry adapted to simplify maintenance trouble shooting procedures.

A still further objective of the present invention is to provide a message registration pulse generator which will provide pulse rates compatible with automated message rate billing.

A further objective of the instant invention is to provide a message registration pulse generator system that has a minimum number of component parts, is easily manufactured and by virtue of the minimal number of parts is of increased reliability with decreased production costs.

A further objective of the present invention is to provide a message registration pulse generator which is responsive to initial trunk seizure and can provide timed message units from seizure or from central office message registration time.

SUMMARY OF THE INVENTION

The message registration pulse generator disclosed in this patent is a device to be used by hotel/motel or central offices where controlled billing of local telephone calls is required. It provides a means by which surcharge and time message units can be generated for calls on monitored telephones. The message units are generated by an output means which includes a counter that is set in response to any one or a combination of an answer pulse indicating a completed internal system call, a central office message registration command, or an elapsed time signal. Each of the three means for setting the counter may be selectively interconnected to provide a weighted output from the counter unique to that specific function.

DESCRIPTION OF THE DRAWINGS

In the drawings, which illustrate the primary embodiment of the instant invention:

FIGS. 2A and 2B are schematic diagrams of the trunk seizure monitor and pulse generating means of the message registration pulse generator.

DESCRIPTION OF THE INVENTION

Figure 1:
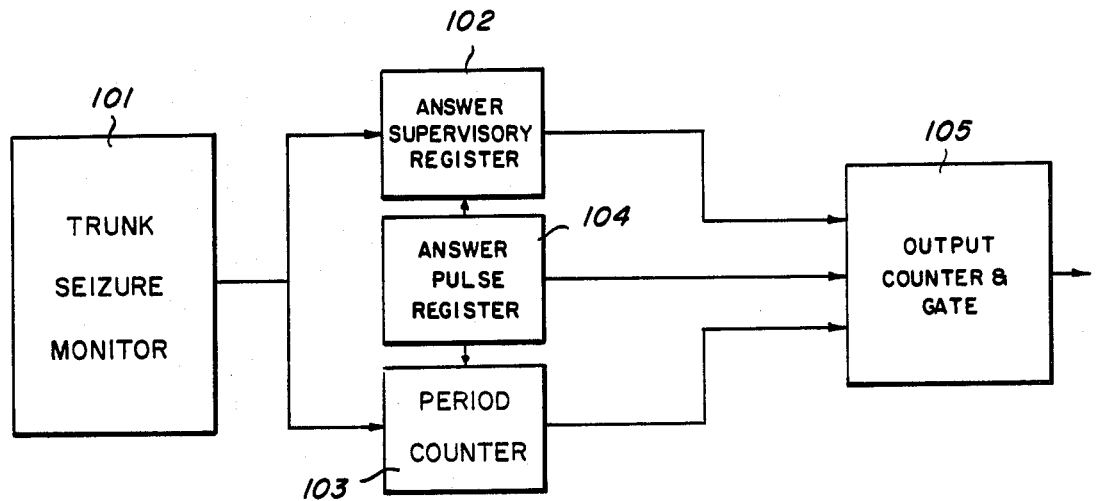
FIG. 1 is a block diagram of the message registration pulse generator.

Referring to the drawings, FIG. 1 illustrates the primary systems of the message registration pulse generation. The trunk seizure monitor 101 is responsive to an input on the sleeve lead and a message registration command. The trunk seizure monitor includes a pair of enabling flipflops that are reset by an appropriate signal on the sleeve lead. One flipflop of the trunk seizure monitor 101 clocks the answer pulse register 104 which provides a coded input to the Output Counter and Gate 105. The same signal that clocks the Answer Pulse Register 104 also resets Period Counter 103 which, after predetermined intervals provides a coded reset signal to the Output Counter and Gate 105. The other flipflop of Trunk Seizure Monitor 101 enables the Answer Supervision Register 102 in response to a message register command from a central office. Answer Supervision Register 102 provides a coded output to reset Output Counter and Gate 105.

The Output Counter and Gate 105 produces output pulses everytime it goes through a reset and count down cycle, thus pulses are produced as a function of the coded resets provided by the Answer Supervision Register 102, Answer Pulse Register 104, and Period Counter 103 representing local system calls, calls processed through the central office, and the duration of a call. The output of Output Counter and Gate 105 is in the form of message unit pulses which are applied to standard billing systems.

In a preferred embodiment of the subject invention the Trunk Seizure Monitor 101, Answer Supervision Register 102, Period Counter 103, Answer Pulse Register 104, and Output Counter and Gate 105 are formed on a common printed circuit board which contains a total of four identical circuits. A pulse generator is contained on a second circuit board which also contains a regulated power supply. This circuit board contains two pulse generators and two regulated power supplies in the preferred embodiment.

A detailed description follows which is directed to one circuit or channel of the preferred embodiment.

Figure 2A:
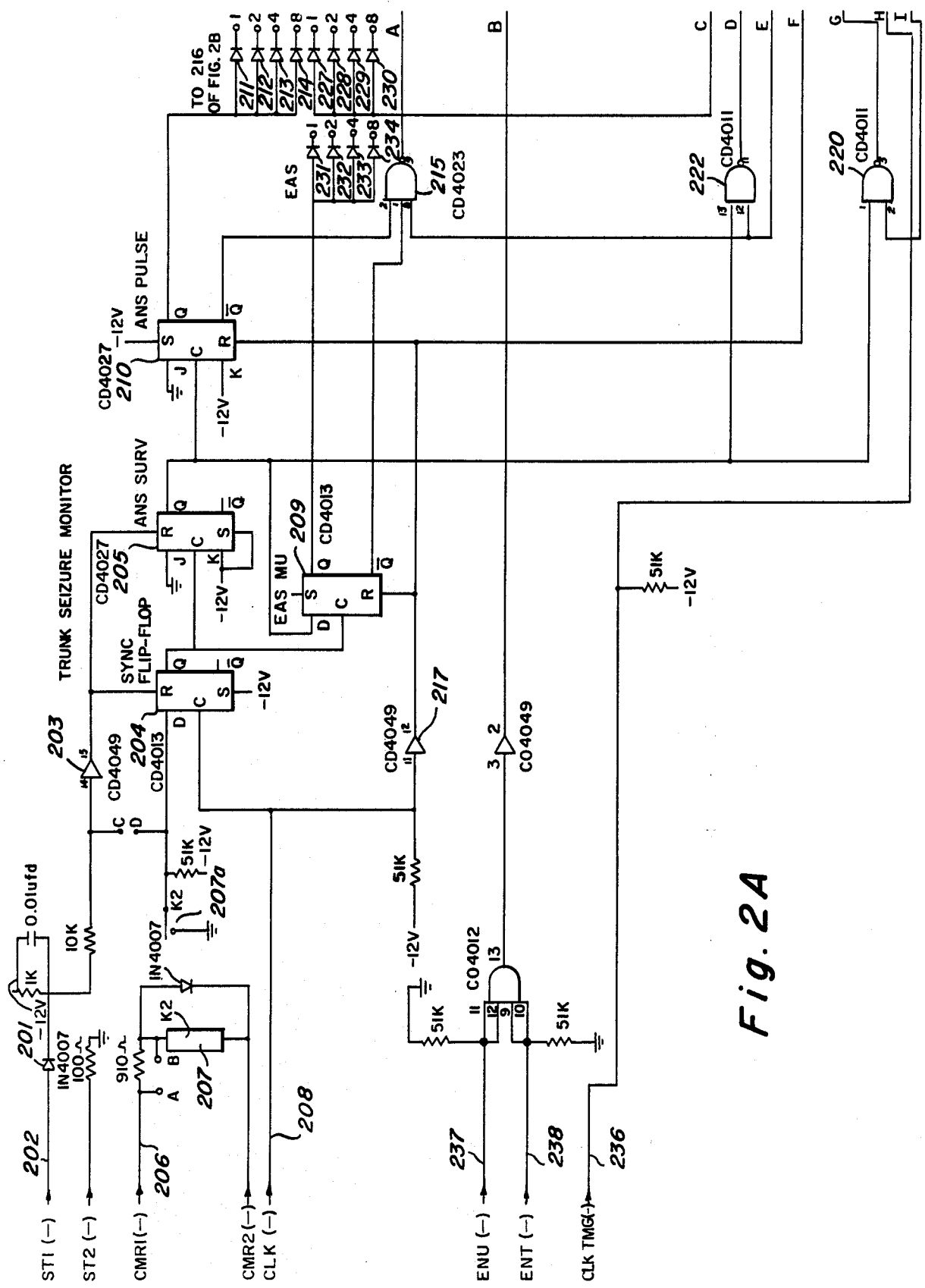

The sequence of operation of the circuit illustrated in FIGS. 2A and 2B is initiated by a telephone call which causes the circuit input at connection ST1(−) to be at ground potential. This applies ground potential to the anode of diode 201 via sleeve lead 202. Grounding the anode of diode 201 causes trunk seizure inverter 203 to produce a negative signal which is applied to the R terminal of sync flipflop 204 and answer supervisory flipflop 205. This removes the ground potential and enables the sync flipflop 204 to accept a central office message registration command via input line 206.

Sync flipflop 204 is one-half of a dual D flipflop functioning in a clocked mode wherein the set and reset inputs must be low. Thus when the reset or R input to flipflop 204 is driven low by inverter 203, the level at the D input will be reflected at the Q output when the positive going edge of a clock pulse is applied to the C input. If the reset or R input to flipflop 204 is high, clock pulses applied to the C input will have no affect on the circuit. In its quiescent state, the D input to flipflop 204 is low due to the negative 12 volts applied through a 51K resistor. However, when relay 207 is energized the relay contacts 207a close to provide a ground or high potential to the D input of flipflop 204 so that the Q output will go high upon clocking and the Q̄ will go low.

A central office message registration command received on input 206 energizes relay 207, closing contacts 207a and grounding the D input of sync flipflop 204. With input R negative and input D grounded, sync flipflop 204 will be set by the first positive transition of a clock pulse on clock input 208 at pin C. When the sync flipflop is set, ground potential is applied from sync flipflop 204 terminal Q to terminal C of the answer supervisory flipflop 205.

The answer supervisory flipflop 205 is one-half of a dual JK flipflop. Inputs to the J and K lines decide what the flipflop is going to produce on the Q and Q̄ outputs upon the occurrence of the positive edge of a clocking pulse applied to the C input. Since the J input of flipflop 205 is ground or high and the K input is a negative 12 volts, the positive going edge of the pulse from sync flipflop 204 will cause the Q output to go high and the Q̄ output to go low.

The positive or ground transition from the sync flipflop 204 to the answer supervisory flipflop 205 clocks the answer supervisory flipflop and causes it to produce a ground output at terminal Q, grounding terminal D of the electronic answer supervision message unit flipflop 209 via terminal Q. The positive transition or ground of terminal Q of answer supervisory flipflop 205 also clocks the answer pulse flipflop 210 via that circuit's input C.

The answer pulse flipflop 210 is the other half of the dual JK flipflop utilized for answer supervisory flipflop 205. It functions in an identical fashion in that both the R and S or reset and set inputs must be low for the circuit to function in the clocked mode, and with the K inputs low and the J inputs high or grounded, the positive going edge of a clock signal applied to the C input causes the Q output to go high or to ground and the Q̄ input to go low.

When the answer pulse flipflop 210 is clocked, the Q output goes to ground and enables the answer supervision message units strapping diodes 211, 212, 213 and 214. These diodes are selectively and permanently tied to the four inputs of output counter 216 to selectively control resetting that counter.

Output counter 216 is an up-down divide-by-10 or divide-by-16 synchronous counter adapted to count by sixteen's. The count progression is backwards, thus output counter 216 is interconnected to function as a divide-by-16 down counter. The circuit retards one count on the negative to ground or low to high transition of clock inputs at the C terminal. The output goes low at the CO terminal of output counter 216 when a zero count is reached by the counter counting backward through the 0000 state. The counter is parallel loaded by presetting a weighted word comprised of selective high levels at the J1, J2, J3 and the J4 inputs. A high at each input has the following weighting: J1 equals 1, J2 equals 2, J3 equals 4, and J4 equals 8. Thus by selectively connecting the various ones of the four diodes 211 through 214, the output counter 216 may be made to produce a single low output in response to a predetermined number of clock pulses ranging from 1 through 15. When all inputs, J1 through J4 of output counter 216 are low, the counter is set at 0000 or in the reset state.

The Q̄ output of the answer pulse flipflop 210 is a negative pulse which is applied to NAND gate 215 which inverts the output and applies it to the PE input of output counter 216. The PE input of output counter 216 is normally low and when it is driven high or to ground, the parallel word at inputs J1 through J4 is loaded into the counter.

NAND gate 215 is a three input NAND gate which produces a high or ground output when any one of the three inputs are low and produces a low output only when all three inputs are high.

The answer pulse flipflop 210 is reset by the next clock input applied from line 208 via inverter 217 to terminal R. Once reset, the answer pulse flipflop remains reset throughout the trunk seizure function and no further loading of output counter 216 is effected by diodes 211 through 214.

When the output counter 216 is pre-loaded, it counts down one step every 200 milliseconds until the pre-loaded number is removed, at which time the carry-out terminal CO goes negative.

The negative output at the CO terminal of output counter 216 inhibits the operation of NAND gate 218 by causing it to have a steady high output. NAND gate 218 is a three input NAND gate which, with any or all inputs low, produces a high output and with all inputs high or ground, produces a low output. Thus the negative input to NAND gate 218 causes a high or ground to be applied to the clock or C terminal of output counter 216 provided at least one of the other inputs to NAND gate 218 is high.

When NAND gate 218 produces a high output, it causes transistor 242 to conduct which energizes relay 235 to produce an output pulse for the circuit. Thus an output is produced everytime output counter 216 is clocked by NAND gate 218 going high or to ground. NAND gate 218 receives a second input from the clock input 208 via inverter 217. Thus when the clock pulse on 208 goes positive to clock sync flipflop 204, a negative going signal is produced at inverter 217 to reset flipflops 209 and 210 as well as flipflops 224 and 226 in the period counter. This same negative going pulse forms one of the inputs to NAND gate 218 to produce a clock pulse at the input to output counter 216 provided the output of output counter 216 is high, that is it has not counted down or an input from 237 or 238 is high. Thus NAND gate 218 will continue to clock output counter 216 each time the clock pulse on 208 goes positive causing a negative going input to the NAND gate until the other two inputs are also negative. This causes the circuit to produce a predetermined number of pulses which are a function of the preset value in the output counter for when the output counter is counted down to 0 it goes low, causing the output of NAND gate 218 to remain high and thus relay 235 will stop cycling its contacts off and on.

When the answer supervisory flipflop 205 is clocked, the output at Q is ground and it enables the one minute counter 219 via NAND gate 220 and the interval counter 221 via NAND gate 222 by driving the reset inputs low. This causes the one minute counter 219 to advance on the negative transition of the timing clock applied from line 236 to input C. Every sixty seconds the output of the one minute counter at terminals Q3, Q4, Q6 and Q9 is decoded by NAND gate 223 and sets the one minute flipflop 224 via inverter 225.

NAND gates 220 and 222 function so that when either or both inputs are low, the output is high but when both inputs are high the output is low. One minute counter 219 is a 12 stage binary ripple counter in which the reset input is normally low and everytime the clock changes from a high to a low, the counter advances one count. When the reset input goes high, all outputs are forced low and held there until the reset or the output of NAND gate 220 goes low. The four outputs of the one minute counter 219 are applied to the inputs of the four-input NAND gate 223 which functions to produce a low output when all inputs are high. The low output is inverted by inverter 225 to clock the one minute flipflop 224 which is a D flipflop which causes the potential at the D input to be reflected on the Q output whenever the C input experiences a positive going transition if the set and reset (S and R) are low.

The set output at Q of the one minute flipflop 224 clocks the interval counter 221 every minute or sixty seconds. The interval counter is a divide-by-10 counter with 1-of-10 outputs. When the reset or R input is low, the counter advances one count on the positive going edge of clock inputs at C. On any count, the decoded output goes high and the others remain low. One of the outputs from 1 through 9 of the interval counter is permanently connected to the clocking input of the period message unit enable flipflop 226 so that flipflop will be clocked by the positive going edge of the output from the interval counter which occurs at every repeated interval equalling 1 through 9 minutes depending upon the strapping. The period message unit enable flipflop 226 is a D flipflop and the high or ground at the D input is reflected at the Q output at the positive transition of the clocking input at C provided the reset or R is low. The reset will be low as long as the clock input at 208 is high, which causes a low input to be applied by inverter 217. The high output of flipflop 226 is applied to diodes 227 through 230 which are selectively permanently connected to the four inputs of output counter 216 to provide variable pre-loading of that counter in a fashion similar to that explained for diodes 211 through 214. When the Q output of flipflop 226 goes high, the $\overline{Q}$ output goes low and NAND gate 215 produces a high output which is applied to the PE input of output counter 216, permitting the counter to be loaded via those diodes of the group 227 through 230 which are permanently connected to inputs J1 through J4.

Relay 207 is responsive to central office message registration commands on line 206. When relay 207 is thus energized, relay contacts 207 may close and provide a high or ground potential at the D input of sync flipflop 204 so that everytime a positive clocked transition occurs at the C input of sync flipflop 204, the Q output will go high and clock the electronic answer supervision message unit flipflop 209. This flipflop is a D flipflop so that the potential at the D input is reflected on the Q output when the flipflop is clocked. Thus if the Q output of answer supervision flipflop 205 is high, the Q output of flipflop 209 will be high and a high or ground potential will be applied to the parallel diodes 231 through 234. These diodes are selectively permanently wired to the four inputs of output counter 216 in a manner similar to that described for diodes 211 through 214. When flipflop 209 is clocked, the $\overline{Q}$ output goes low and causes a high to be applied to the PE input of output counter 216 via NAND gate 215. The high input at PE allows the output counter 216 to be loaded by the parallel inputs of diodes 231 through 234 as previously described for the other loading diode assemblies.

Thus the output counter 216 may be preset by any one or a combination of three different sets of loading diodes to enable an output NAND gate 218 to pulse relay 235 everytime a clock pulse is received. Contact closure of relay 235 normally lasts for a duration of 100 milliseconds.

The clock input may be adjusted by an external means which varies the one minute counter 219 cycle via input 236. This provides a variable timer structure for use to distinguish between night/day and weekend rate changes.

Inputs 237 and 238 provide steering of the clock command to the output NAND gate 218 when only one circuit output at a time is desired.

Light emitting diode 239 provides a visual output indication and the optional circuit 240 provides a light emitting diode coupled output via 241.

Figure 3:
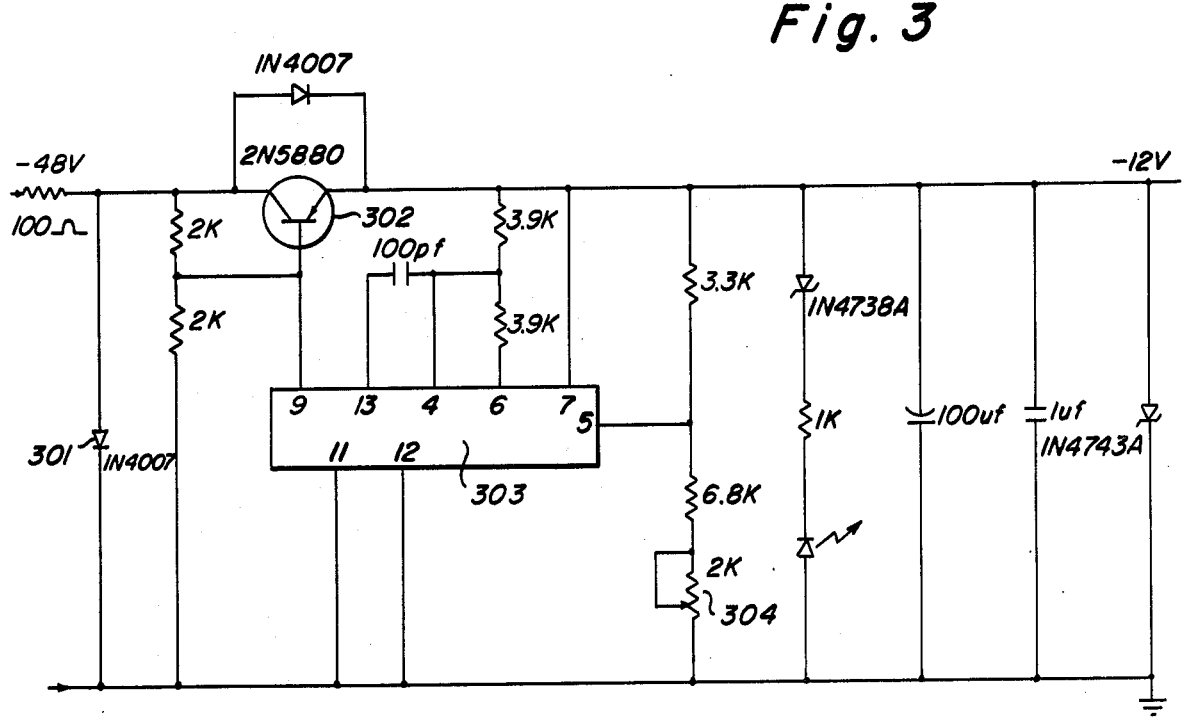
FIG. 3 is a schematic diagram of the regulated power supply for the message registration pulse generator.
Figure 4:
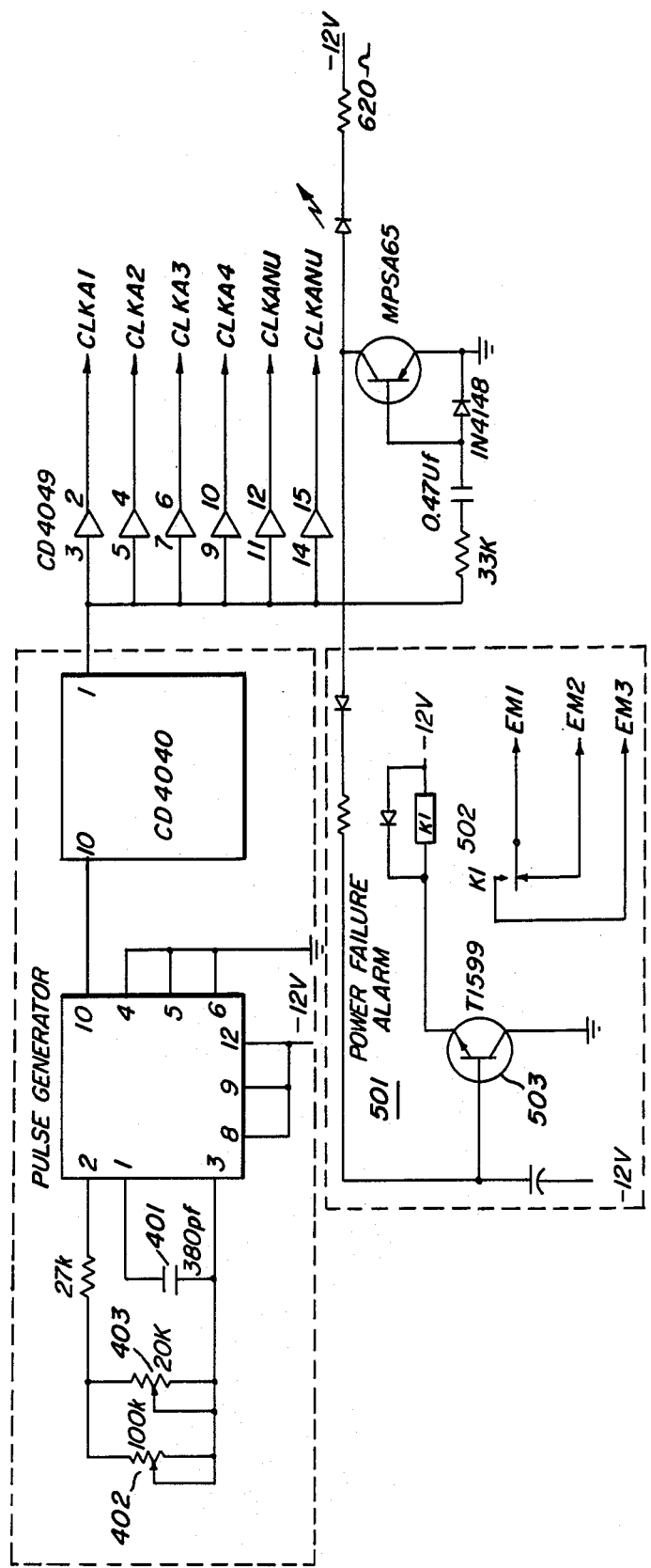
FIG. 4 is a schematic diagram depicting the clock pulse generator incorporated in the present invention.

The clock and power regulator circuit board illustrated in FIGS. 3 and 4 contains two identical clock circuits and two identical power regulator circuits. The circuit duplication on this circuit board and the trunk seizure monitor and pulse generating circuit board simplifies trouble shooting by enabling maintenance personnel to interchange primary circuits.

One power regulator circuit is illustrated in FIG. 3. It is a series regulator that reduces a negative 48 volt input to a regulated output of minus 12 volts. A reverse voltage protection diode 301 is installed to protect the circuit if a voltage input of reverse polarity is applied. Voltage regulation is accomplished by controlling the base potential of transistor 302 by circuit means 303 which provides a feedback voltage as a function of a reference voltage. The output may be adjusted by potentiometer 304.

The clock circuit illustrated in FIG. 4 is an RC coupled monostable multivibrator circuit with a special temperature compensated capacitor 401 for frequency stability. The clock circuit has two external adjustment potentiometers 402 and 403 for fine and course frequency adjustments. Two identical clock circuits are provided on the circuit board but only one is illustrated.

The clock circuit in a preferred embodiment utilizes a low power monostable multivibrator integrated circuit 404 which is intially triggered by application of power to the circuitry and maintained by the simultaneous low input at +T and high input at −T. The output of the multivibrator is provided at the Q output and applied to a 12 stage binary ripple counter 405 which produces an output for every two inputs as wired in this specific circuit.

FIG. 4 also contains a schematic of one of the power failure circuits 501. These circuits provide an alarm via the normally closed contacts of relay 502 which are held open when power is on the line and maintaining transistor 503 conductive.

System operation is initiated when an outside nth level trunk from a monitored extension, a ground, or low resistance to ground is placed on the sleeve lead 202 from a trunk circuit. This prepares a system so that when the call is answered, a negative 48 volt signal is returned from the central office to the central office message registration command input 206. This is a pulse having a minimum duration of 210 milliseconds.

Additional pulses on the central office message registration command lead 206 are then treated either as a single pulse or carry a weight of from 1 to 15 depending on the strapping of the electronic answer supervision output diodes and the interval between pulses. The system allows at least 200 milliseconds per output pulse.

Once the answer supervision pulse flipflop 205 is set, it will remain so until the trunk is released and the sleeve lead signal is removed.

While the answer supervision pulse flipflop 205 is set, the Q output will enable the electronic answer supervision message unit flop 209. In this state, each time the sync flipflop 204 is clocked by a central office message registration command input, the electronic answer supervision message unit flipflop 209 will set, preloading the electronic answer supervision weighted word into the output counter.

To improve the versatility of the timed message unit section, the unit has the optional capability of a variable frequency clock. This is used in instances where the end user wishes to vary the day/night and weekend billing rates for message timing. The variable clock is supplied at input 236.

The message pulse generator circuit described above is located on a subassembly board containing four identical circuits with symmetrical interconnections to permit connecting the board in a first or second orientation. This facilitates trouble shooting and problem solution by using a technique of isolating a defective circuit on the board, removing the board and reinserting it in a different orientation and determining what circuit now has the malfunction. If one of the circuits of the board is bad, the malfunction indication will move to a different channel, however if the board circuits are good the malfunction will stay in the same channel as originally detected. This latter instance indicates the message registration pulse generator is not defective.

While the preferred embodiment of this invention has been illustrated and described, variations and modifications may be apparent to those skilled in the art. Therefore, we do not wish to be limited thereto and ask that the scope and breadth of this invention be determined from the claims which follow rather that the above description.

What we claim is:

1. A message registration pulse generator, comprising:
    a trunk seizure monitor for providing a predetermined voltage level output in response to sensing a completed telephone interconnection;
    a clock pulse generator for providing a continual series of equally spaced electrical pulses;
    an output counter including circuit means presettable to represent a predetermined number of electrical pulses;
    an answer supervision register responsive to said trunk seizure monitor output and said clock pulse generator for presetting said output counter;
    an answer pulse register responsive to said trunk seizure monitor output and said clock pulse generator for presetting said output counter;
    a period counter responsive to said trunk seizure monitor output and said clock pulse generator for initiating the timing of a predetermined time period, said period counter presetting said output counter after the expiration of said timed period;
    said output counter including a pulse input means and an output means for providing an output signal when a number of pulses have been applied to said pulse input means which equal the preset number in said output counter; and
    a message registration output pulse gate means, inhibitable by said output signal of said output counter, for producing message registration output pulses and applying pulses to said output counter pulse input in response to said clock pulse generator when not so inhibited.

2. A message registration pulse generator as defined in claim 1 wherein said trunk seizure monitor comprises:
    a sync flipflop adapted to be reset by a sleeve lead input;
    an answer supervisory flipflop adapted to be reset by a sleeve lead input and clocked by the output of said sync flipflop;
    said answer pulse register responsive to the output of said answer supervisory flipflop;

said answer supervision register responsive to the output of said sync flipflop and said answer supervisory flipflop; and said period counter responsive to the output of said answer supervisory flipflop.

3. A message registration pulse generator as defined in claim 2 wherein said answer pulse register comprises:
an answer pulse flipflop reset by said clock generator and clocked by said answer supervisory flipflop; and
a plurality of electrically parallel diodes for coupling the output of said answer pulse flipflop to said output counter as a presetting signal.

4. A message registration pulse generator as defined in claim 3 wherein said answer supervision register includes a supervision flipflop reset by said clock pulse generator, enabled by the output of said answer supervision flipflop and clocked by the output of said sync flipflop; and
a plurality of electrically parallel diodes for coupling the output of said supervision flipflop to said output counter as a presetting signal.

5. A message registration pulse generator as defined in claim 4 wherein said period counter comprises:
a one minute counter responsive to said answer supervisory flipflop output;
a one minute flipflop adapted to be clocked by the output of said one minute counter and reset by said clock pulse generator;
an interval counter responsive to the output of said one minute flipflop; and
a period message unit enable flipflop adapted to be reset by said clock pulse generator and clocked by an output of said interval counter.

6. An apparatus as defined in claim 5 wherein said interval counter provides a plurality of outputs representing different time increments and a selected one of said outputs is used to clock said period message unit enable flipflop.

7. An apparatus as defined in claim 6 wherein said one minute flipflop includes a reset output and said one minute counter includes a reset input and said one minute flipflop reset output is coupled to said one minute counter reset input.

8. An apparatus as defined in claim 7 wherein said message registration output gate comprises: a NAND gate responsive to the output of said output counter and said clock pulse generator; and a relay responsive to the output of said NAND gate.

9. An apparatus as defined in claim 8 further including a means responsive to the $\overline{Q}$ outputs of said supervision flipflop, answer pulse flipflop and period message unit enable flipflop for enabling said output counter to receive said presetting signals.

10. An apparatus as defined in claim 9, comprising: a central office message registration relay for selectively applying an enabling potential to the input of said sync flipflop.

11. An apparatus as defined in claim 10, comprising:
a voltage controlled series voltage regulator adapted to provide operating voltage to said message registration pulse generator;
a second transistor responsive to the output of said voltage regulator;
a normally closed relay responsive to said second transistor; and
an alarm means responsive to the closed contacts of said normally closed relay.

12. An apparatus as defined in claim 11 wherein said clock pulse generator includes a timing pulse generator including a first potentiometer for providing course frequency control and a second potentiometer for providing fine frequency control.

13. An apparatus as defined in claim 5 wherein said one minute counter is clocked at a fequency rate different than said pulses of said clock pulse generator.

* * * * *